United States Patent
Schwab

Patent Number: 5,197,838
Date of Patent: Mar. 30, 1993

[54] BLIND RIVET WITH AN APPARATUS ENGAGEABLE WITH CONICAL SHAPED RIVET PIN AND APPARATUS FOR SETTING SUCH BLIND RIVETS

[76] Inventor: Manfred Schwab, Adolfstrasse 4B, D-6204 Taunusstein 4, Fed. Rep. of Germany

[21] Appl. No.: 666,855

[22] Filed: Mar. 8, 1991

[51] Int. Cl.⁵ .............................................. F16B 13/04
[52] U.S. Cl. ........................................ 411/43; 411/34
[58] Field of Search ..................................... 411/34–38, 411/43, 69, 70

[56] References Cited

U.S. PATENT DOCUMENTS

| | | | |
|---|---|---|---|
| 2,466,811 | 4/1949 | Huck | 411/34 |
| 2,526,235 | 10/1950 | Huck | 411/43 |
| 4,556,351 | 12/1985 | Wollar et al. | 411/38 |
| 4,627,775 | 12/1986 | Dixon | 411/43 |
| 4,844,673 | 7/1989 | Kendall | 411/43 |

FOREIGN PATENT DOCUMENTS 427160 8/1948 Italy ........................................ 411/43

Primary Examiner—Neill R. Wilson
Attorney, Agent, or Firm—Barnes, Kisselle, Raisch, Choate, Whittemore & Hulbert

[57] ABSTRACT

In a blind rivet having a blind rivet body which comprises a rivet head with a hollow shank formed thereon and through which extends a rivet pin which carries a thickening portion arranged at the end of the hollow shank outside the rivet body, the end of the rivet pin, which is remote from the rivet head, in the region of the clamping chuck which engages same in the setting operation, has a portion which decreases towards the rivet head, preferably a cone portion. An apparatus for setting a blind rivet of that kind has a clamping chuck which during the rivet setting operation engages the cone portion of the blind rivet, wherein the engagement surface of the clamping chuck extends from the inside outwardly in the pulling direction, being matched to the cone portion.

9 Claims, 2 Drawing Sheets

BLIND RIVET WITH AN APPARATUS ENGAGEABLE WITH CONICAL SHAPED RIVET PIN AND APPARATUS FOR SETTING SUCH BLIND RIVETS

The invention relates to a blind rivet having a blind rivet body which comprises a rivet head with hollow shank formed thereon and through which extends a rivet pin which carries a thickening portion which is arranged at the end of the hollow shank outside the rivet body.

Blind rivets of that kind are set by the blind rivet setting apparatus engaging the rivet pin and pulling same back, whereby the hollow shank of the blind rivet body is upset and the workpieces to be joined together are fixed. When the riveting operation is concluded, the force applied is so great that the rivet pin tears off at a notch or recess provided thereon. The high forces acting on the rivet pin make it necessary for the clamping jaws to have raised portions in order not to slip off when transmitting the forces to the rivet pin. In the case of rivets comprising hard material such as for example high-grade steel rivets, a very high degree of wear occurs at the raised portions on the clamping jaws and a very high level of material abrasion occurs, particularly when dealing with soft rivets, for example aluminium rivets. The fine particles of material pass into the apparatus which as a result is adversely affected in terms of its function, if it is not rendered inoperable and has to be cleaned.

The invention is therefore based on the problem of providing a blind rivet and an apparatus which is suited thereto for setting blind rivets, in which a high level of wear at the clamping jaws and disadvantageous material abrasion at the rivet pins is avoided.

The solution to that problem provides that, in a blind rivet of the kind set forth in the opening part of this specification, the end of the rivet pin which is remote from the rivet head, in the region of the clamping chuck which engages same in the setting operation, has a portion which decreases towards the rivet head, preferably a cone portion.

Desirably the cone portion is an integrated part of the rivet pin. It may also be advantageous however for the cone portion to represent an independent member and to be joined to the rivet pin.

In a further development thereof, the invention proposes that disposed at the rearward end of the cone portion is an end portion of an outside diameter which corresponds to the outside diameter of the rivet pin. A further development of the invention is distinguished in that disposed at the rearward end of the cone is a projection, wherein the end portion advantageously forms the projection.

The invention also provides an apparatus for setting those blind rivets, with the particularity that the clamping chuck engages the cone portion of the blind rivet during the rivet setting operation. An advantageous embodiment of the apparatus provides that the inner surface of the clamping chuck, which engages the blind rivet, extends from the inside outwardly in the pulling direction, being matched to the cone portion.

In accordance with a further development the invention provides that the working surface of the clamping chuck, which engages the cone portion, has an entrainment edge at the side of the chuck which is towards the end of the rivet pin.

The invention will be described in greater detail hereinafter with reference to an embodiment. In the drawings.

Figure 1:
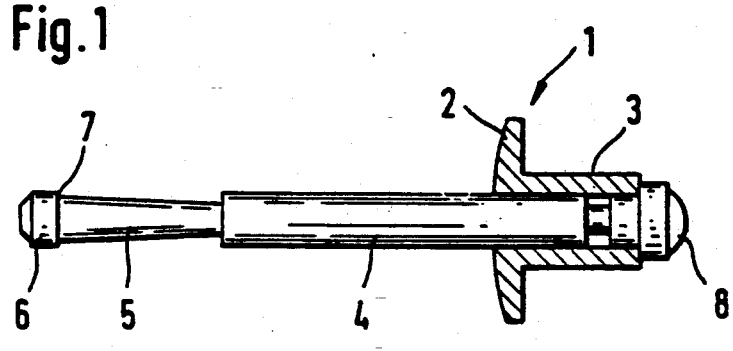
FIG. 1 shows a blind rivet according to the invention, with rivet pin.
Figure 2:
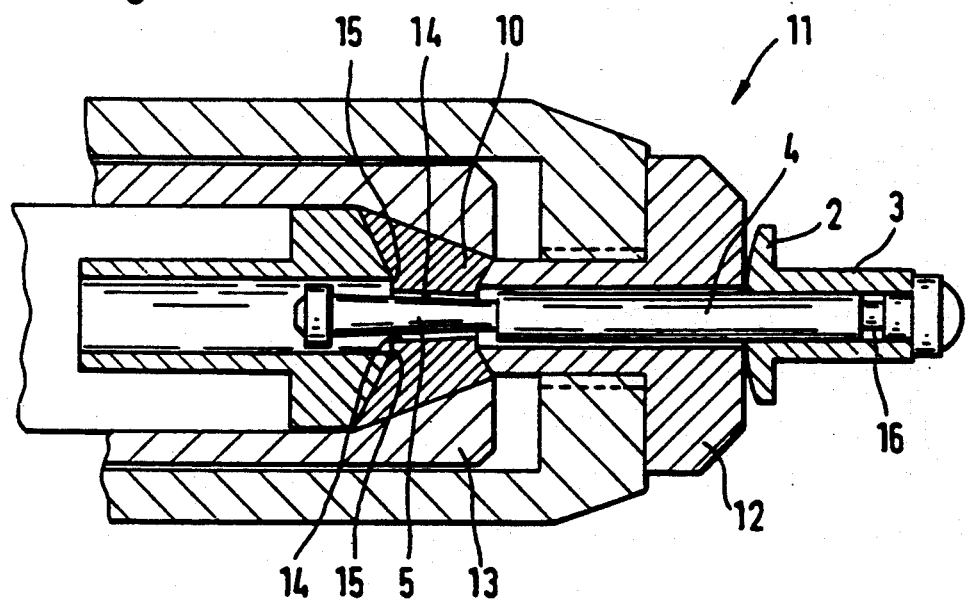
FIG. 2 is a view in section of part of an apparatus for setting a blind rivet as shown in FIG. 1.
Figure 3:
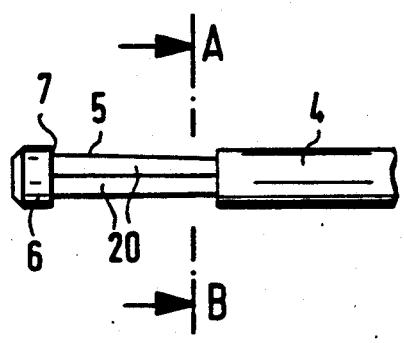
FIG. 3 is a side view of a modified form of blind rivet.
Figure 4:
FIG. 4 is a sectional view taken along the line 4—4 in FIG. 3.

FIG. 1 shows a blind rivet 1 with a rivet head 2 and a hollow body 3 which is formed thereon and through which extends a rivet pin 4 which has a thickening portion 8 disposed at the end of the hollow shank 3 outside the rivet body. The end of the rivet pin 4, which is remote from the rivet head 2, has a cone portion 5 which is disposed in the region in which the clamping chuck 10 of a blind rivet setting apparatus 11 of which part is shown in FIG. 2 engages, in the rivet setting operation. The surface of the cone portion 5 tapers towards the rivet head 2. Instead of the round cone surfaces, it is also possible to provide inclinedly extending side surface 20 on the rivet pin 4 as shown in FIGS. 3 and 4. The cone portion 5 is advantageously in the form of an integrated part of the rivet pin 4. The cone portion 5 however may advantageously represent an independent portion and may be joined to the rivet pin 4, for example by means of a press fit. Provided at the rearward end of the cone portion 5 is an end portion 6 of an outside diameter which corresponds to the outside diameter of the rivet pin 4. In an advantageous development, provided at the rearward end of the cone portion 5 is a projection 7, the end portion 6 advantageously forming the projection 7.

As FIG. 2 shows, in the rivet setting operation, the clamping chuck 10 engages the cone portion 5 while the rivet pin 4 rests in the mouthpiece 12 of the blind rivet setting apparatus. As FIG. 2 also shows, the inner surface 14 of the clamping chuck 10, which engages the blind rivet 1, extends from the inside outwardly in the pulling direction, being matched to the cone portion 5. In addition the working surface 14, which engages the cone portion 5, at the side towards the end of the rivet pin, has an entrainment edge 15. If the clamping pressure is not sufficient, the entrainment edge 15 can come into engagement with the projection 7 in that way, thereby improving the transmission of force.

When the pulling member 13 applies a force towards the left in FIG. 2 to the clamping chuck 10, the inclinedly extending working surfaces 14 transmit the force to the cone portion 5 of the rivet pin 4, thereby initiating the operation of upsetting the hollow body 3 and thus the rivet setting operation, until the rivet pin 4 tears away at 16. The advantageous transmission of force to the rivet pin 4 by way of the cone portion 5, which is produced in the above-indicated fashion, avoids a high rate of wear in respect of the clamping chuck 10 and abrasion of material on the cone portion 5 of the rivet pin 4.

I claim:

1. A blind rivet having a blind rivet body which comprises a rivet head with hollow shank formed thereon and through which extends a rivet pin which carries a thickening portion which is arranged at the end of the hollow shank outside the rivet body, characterized in that the end of the rivet pin (4), which is remote from the rivet head (2), has a pull portion (5) which continuously decreases towards the rivet head (2), preferably a cone portion (5), said pull portion (5) being an end portion (6) with an outside diameter which corresponds to the outside diameter of the rivet pin (4), said cone portion (6) forming a projection (7), and a plurality of inclinedly extending side surfaces being provided on the rivet pin (4) in the region of the clamping chuck (10) which engages same in the setting operation.

2. A blind rivet having a blind rivet body which comprises a rivet head with hollow shank formed thereon and through which a rivet pin extends which carries a thickening portion which is arranged at the end of the hollow shank outside the rivet body, and a pull portion which is arranged oppositely to the thickening portion of the rivet pin, characterized in that the surface of the entire pull portion (5) decreases in its diameter toward the rivet head (2).

3. A blind rivet according to claim 2 characterized in that the surface of the pull portion (5) tapers conically toward the rivet head (2).

4. A blind rivet according to claim 2 characterized in that the pull portion (5) has an end portion (6) having an outside diameter which corresponds to the outside diameter of the rivet pin (4).

5. A blind rivet according to claim 4 characterized in that the end portion (6) of the pull portion (5) forms a projection (7).

6. A blind rivet according to claim 2 characterized in that the surface of the pull portion (5) is formed by a plurality of inclinedly extending side surfaces (20).

7. A blind rivet as claimed in claim 2 including an apparatus for setting the blind rivet comprising an anvil nose portion (12) having an elongated, annular opening engageable with the rivet pin (4) of the blind rivet (1) during a rivet setting operation,
   a clamping chuck assembly (10) for gripping the pull portion (5) of said blind rivet (1) during said operation and
   a chuck actuating member (13) for moving said clamping chuck assembly (10),
   said clamping chuck assembly (10) comprising chuck jaws (10) with the clamping surface (14) of said jaws (10) being complementary with the surface of said pull portion (5).

8. The blind rivet including the apparatus according to claim 7 with a clamping surface (14) being shaped like an envelope of a truncated cone tapering towards said anvil nose portion (12).

9. The blind rivet including the apparatus according to claim 7 including a clamping surface (14) having an entrainment edge being positioned at that side of said clamping surface (14) which is opposite to the anvil nose portion (12).

* * * * *